United States Patent

Francois

[15] 3,638,281

[45] Feb. 1, 1972

[54] BELT SPLICES

[72] Inventor: Edgar Francois, Wayne, N.J.

[73] Assignee: Uniroyal, Inc., New York, N.Y.

[22] Filed: June 18, 1970

[21] Appl. No.: 47,444

[52] U.S. Cl. ............................................24/31 B, 24/33 B
[51] Int. Cl. ....................................................F16g 3/00
[58] Field of Search..................198/193; 28/72.3; 24/31, 33; 74/231 J

[56] References Cited

UNITED STATES PATENTS

| 89,820 | 5/1869 | Walker | 24/31 H |
| 322,986 | 7/1885 | Smith | 24/33 B |
| 1,075,078 | 10/1913 | Wilkinson | 24/33 B |
| 2,898,652 | 8/1959 | Ireland | 24/33 M |

FOREIGN PATENTS OR APPLICATIONS

| 4,280 | 1910 | Great Britain | 24/33 B |
| 6,593 | 0/1909 | Great Britain | 24/33 B |
| 164,082 | 0/1921 | Great Britain | 24/31 B |

*Primary Examiner*—Donald A. Griffin
*Attorney*—Steven H. Bazerman

[57] ABSTRACT

The invention disclosed is a splice for connecting the ends of conveyor belting and the like formed from at least two relatively rigid fasteners. Each fastener is attached to at least one of the belt ends to be spliced by rivets through the fastener and the belt end. The rivets are arranged in two or more rows. The first row of rivets is mounted in holes in the fastener of such a shape as to allow substantially no relative movement between the fastener, the belt and the rivets passing therethrough. At least one other row of rivets is positioned further from the end of the belt than the first row and is mounted through the fastener in elongated slots inclined at an angle to the longitudinal centerline of the belt so that longitudinal movement between the rivets and the fastener in a direction along the belt is allowed concurrently with the transfer of load between the belt and the fastener.

13 Claims, 5 Drawing Figures

PATENTED FEB 1 1972

INVENTOR.
Edgar Francois
BY
Steven Bozeman
ATTORNEY

INVENTOR.
Edgar Francois
BY
Steven Bogerman
ATTORNEY

BELT SPLICES

BACKGROUND OF THE INVENTION

The present invention relates to a mechanical splice for connecting the ends of conveyor belting and the like and, more specifically, to a splice and a fastener for use in the splice wherein load is transmitted between the splice and the belting by two or more rows of rivets mounted in each of the fasteners forming the splice.

Splices for conveyor belting and the like, using at least one rigid U-shaped member riveted to each of the belt ends to be spliced, are a known expedient as can be seen, for example, in U.S. Pat. No. 1,075,078 issued to Wilkinson on Oct. 7, 1913. However, with such prior art arrangements the tensile forces that a spliced conveyor belt can withstand in use are considerably less than the tensile forces than an unspliced portion of the belt can withstand. The premature fastener failure or "pullout" of the belt at the rivets is a result of high strain concentration around the rivets. While increasing the number of rivets in a single row increases the maximum "pullout" load, a practical limit is soon reached when just enough fastener material is left between the rivets to sustain the tensile force developed in the fastener. Attempts to increase the maximum pullout load by increasing the number of rows of rivets do not in fact significantly increase the maximum pullout load.

SUMMARY OF THE INVENTION

The present invention overcomes the problem of low pullout load through the realization that multiple rows or rivets do not increase maximum pullout load because of the difference in elongation between the belt and fastener under load. The belt is normally made of a composite of fairly elastic materials such as rayon, nylon, polyester or equivalent fibers, cords or fabrics coated with such materials as neoprene, styrene-butadiene rubber, butyl rubber, polyurethane, or polyvinyl chloride plastic. Belts so constructed stretch appreciably under load. In contrast, the fastener and rivets are normally constructed of a relatively rigid material such as steel and brass. When under given load the belt stretches between consecutive rows of rivets while the fasteners and rivets do not deform, next to no load is transferred between the fastener and the belt at any but the row of rivets farthest from the belt end in each fastener. The splice of the present invention, however, successfully uses multiple rows of rivets on each fastener. Only some of the rows of rivets secure the fastener to the belt in such a manner as to substantially prevent relative movement between the belt and fastener. At least one additional row of rivets passes through the fastener and belt while concurrently permitting some appreciable transfer to load between the belt and the fastener at the additional row of rivets.

BRIEF DESCRIPTION OF THE DRAWINGS

The present invention will be clearly understood in connection with the accompanying drawings in which.

DESCRIPTION OF THE PREFERRED EMBODIMENTS

Figure 1:
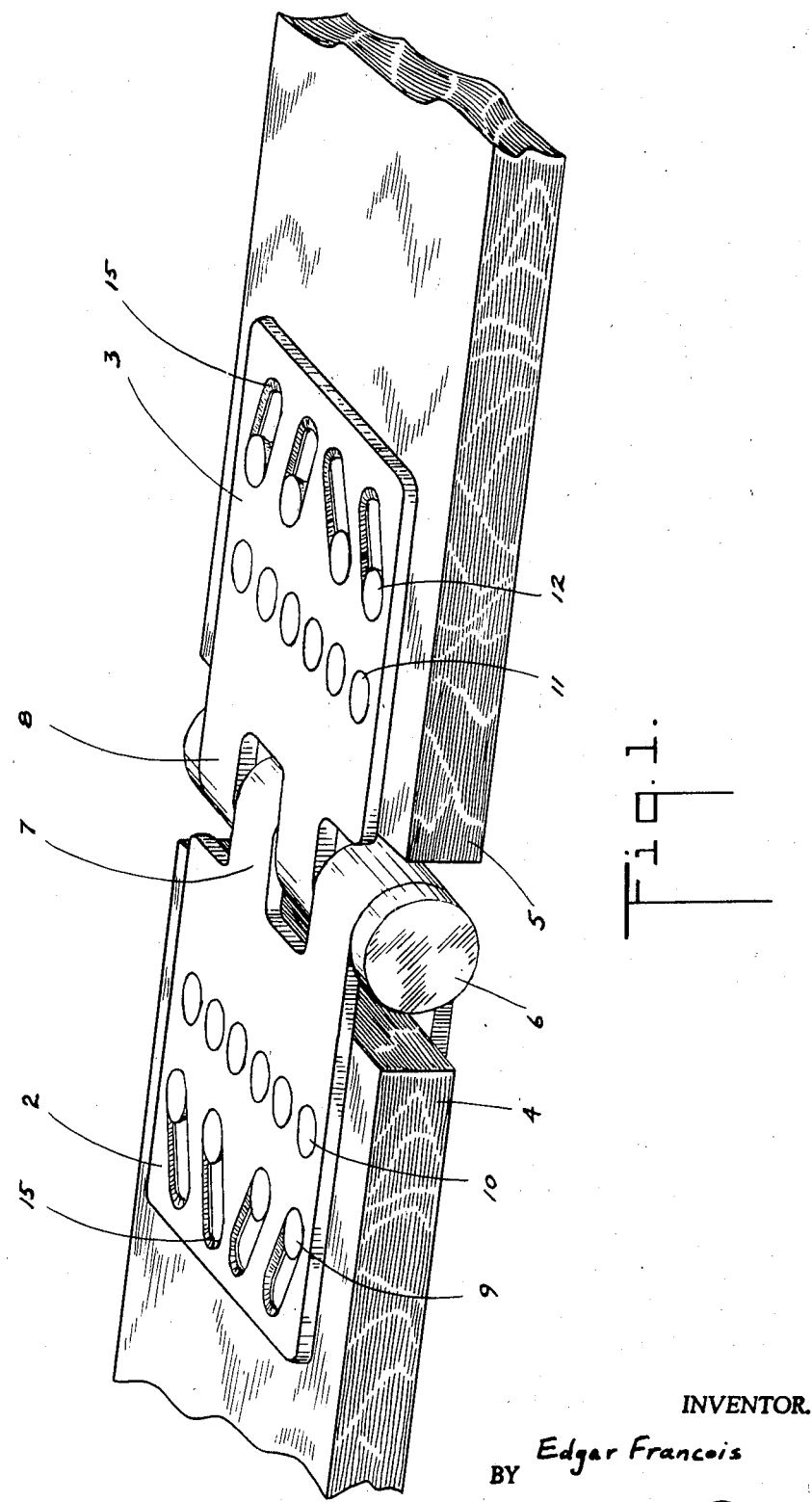
FIG. 1 is a perspective view of an unloaded conveyor belt spliced by means of the preferred embodiment of fastener according to the present invention.
Figure 2:
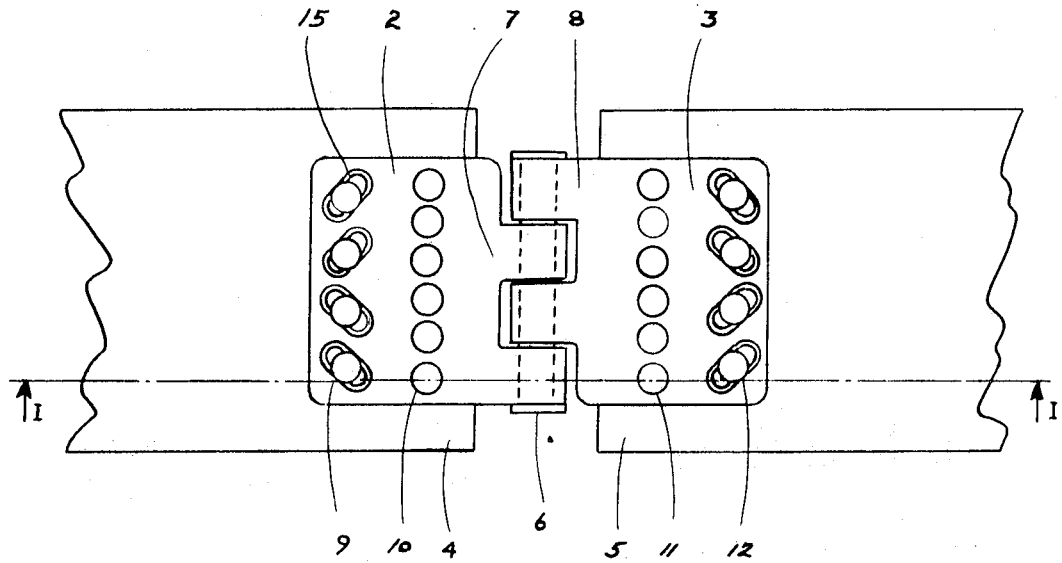
FIG. 2 is a plane view of the splice of FIG. 1 under load.
Figure 3:
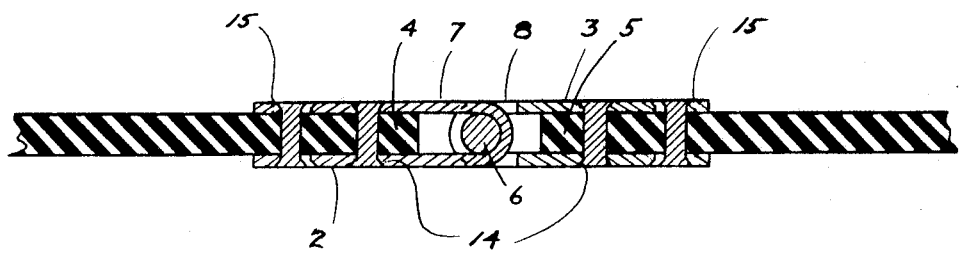
FIG. 3 is a transverse section taken on the line I—I of FIG. 2.

Referring now to FIGS. 1–3, a belt splice is seen having at least two U-shaped fasteners 2 and 3 attached to belt ends 4 and 5 and held together by a hinge pin 6. On wider belts more than one fastener may be used for each end. The U-shaped fasteners 2 and 3 are notched to form interfitting fingers 7 and 8 respectively. The fingers 7 and 8 interact with belt ends 4 and 5 to form a tube or hollow cylinder in which hinge pin 6 is mounted. The hinge pin 6 may be of any suitable construction so that it will remain inserted when the splice is in use, such as the one seen in the patent to Wilkinson previously cited.

Each fastener 2 and 3 is attached to its respective belt ends 4 and 5 by at least two rows of rivets 9, 10, 11 and 12. Each rivet in the rows 10 and 11 closest to the locking pin 6 is mounted through a close fitting circular opening or orifice 14 in the fastener and through the belt end in such a manner as to permit substantially no relative movement between the fastener and the belt under load, i.e., no movement other than that due to the stretching of the belt. As seen in FIG. 3, in order to permit the rivets to be mounted flush with the outer surface of the fastener, the sides of the orifice may be beveled or stepped.

The rivets in the outer rows 9 and 12 are fixedly mounted in the belt ends and slidably mounted in angled slots 15 in the fasteners 2 and 3 such that relative movement is possible between the belt and fastener at slots 15 while permitting the load to be transmitted between the belt and fastener at the outer rows of rivets 9 and 12. The slots 15 may also have beveled or stepped sides to permit flush mounting of the rivets.

The slots 15 are in two groups, each group angled in alternate direction from the other to balance and eliminate rotation of the fastener under load. This may also be accomplished by having separate rows of slots in different directions, by alternating every other slot or any other pattern of slots 15 which will balance out the rotational forces.

As the angle the slots 15 make with a line drawn transversely across the belt approaches zero, less and less relative movement is allowed between the belt and the fastener. Ultimately, as the angle nears zero, the pattern for the transfer of load approaches that of a fastener having two fixed rows. Equally, when the angle approaches 90°, less and less load is transmitted between the fastener and the belt. It is felt that with most belt materials in use today, the angle should lie between 30° and 60°.

By this arrangement, load is effectively allowed to be transmitted between two or more rows of fasteners and the belt despite the elongation of the belt between the rivets while under load. The major portion of load is carried by rivet rows 10 and 11, but a substantial increment of load is carried by rows 9 and 12.

Figure 4:
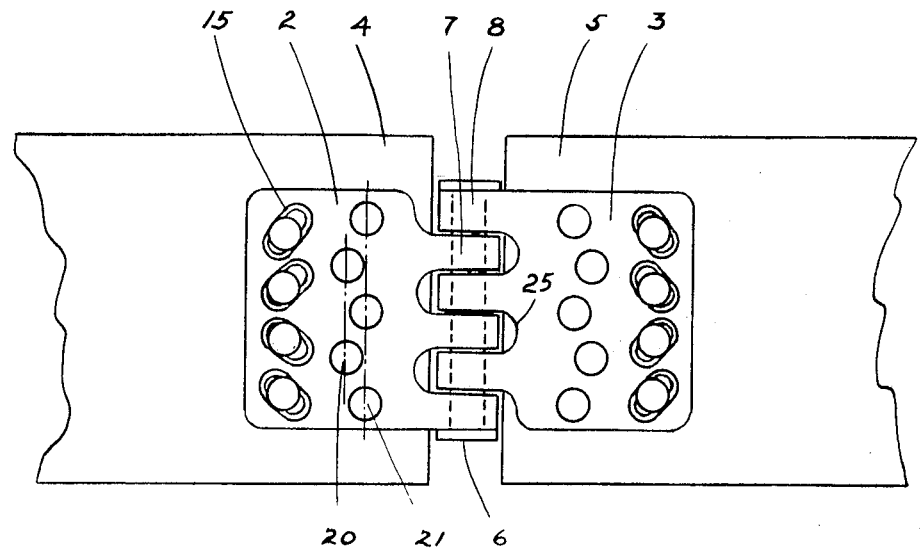
FIGS. 4 and 5 are plane views of additional embodiments of splices according to the present invention.

Another embodiment of the present invention is seen in FIG. 4. In order to strengthen the metal fasteners 2 and 3, the inner portions 25 of fingers 7 and 8 may be rounded, eliminating areas of strain concentration. Additionally, to maximize the amount of metal in the fastener between rivets, the rivet orifices 14 may be slightly staggered as shown. Of course, they should not be spaced so as to form separate rows, i.e., the diameter of an orifice 14 should be equal to or greater than the distance between the centerlines 20 and 21 of the slightly staggered orifices 14 which will house rivet row 10.

Figure 5:
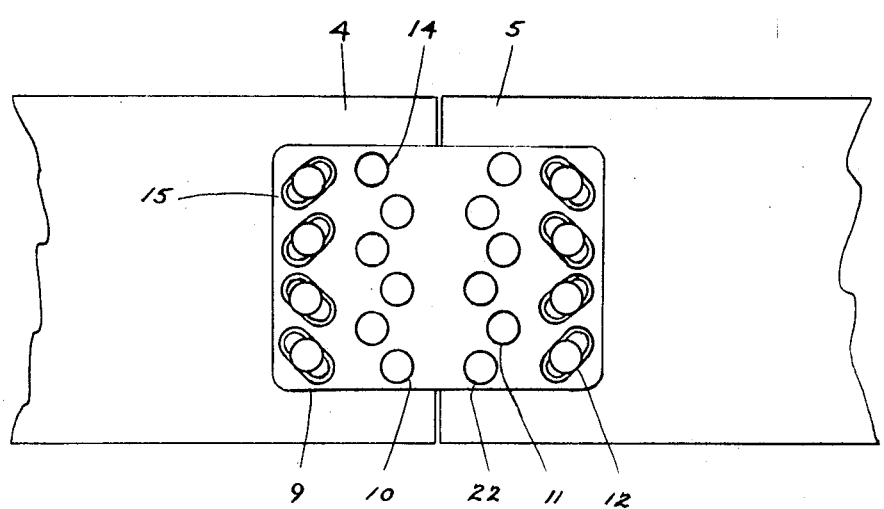

The present invention may also be used in conjunction with a plate-type fastener as shown in FIG. 5. Instead of having two separate fasteners 2 and 3 joined by a hinge pin 6, rigid plates 22 are placed across both sides of belt ends 4 and 5 and attached by rows of rivets 9–12. The rivets are positioned in orifices 14 and slots 15 in the plates 22. The orifices 14 and slots 15 are of a shape and positioned as taught with regard to the other embodiments of this invention. The rivet slots, and orifices cooperate in the same manner as with the other embodiments.

While I have disclosed several specific embodiments of the present invention, it is to be understood that these are exemplary only and that other further variations could be made while staying within the spirit of this invention.

Having thus described the invention, what is claimed and desired to be protected by Letters Patent is:

1. A splice for conveyor belting and the like comprising:
   a belt with two ends to be spliced and two rigid members,
   each rigid member being attached to at least one of the belt ends to be spliced by a first attaching means fixing a portion of the belt to the rigid member so that substantially no relative motion is allowed between the rigid member, the belt and the first attaching means, and a second attaching means allowing relative movement between the belt and the rigid member while concurrently permitting the transfer of load longitudinally along the belt at the second attaching means.

2. A fastener for splicing conveyor belting and the like comprising:

a rigid member adapted to be attached by attaching means to at least one end of a belt to be spliced, said member having a plurality of orifices for receiving the attaching means therein, consisting of a first two rows of orifices and a second two rows of orifices in the form of slots, said second two rows of slots being at an angle to the longitudinal axis of a belt properly positioned relative to the fastener.

3. A splice for conveyor belting and the like comprising:
a belt with two ends to be spliced,
two rigid U-shaped members;
each of said U-shaped member having its legs surrounding one end of a belt to be spliced;
each of said U-shaped members having a curved surface forming the bottom of the U interrupted by slots to form interengaging fingers with said other U-shaped member;
a hinge pin passing through said interengaging fingers for holding the respective U-shaped members together;
each of said U-shaped member having a first attaching means fixing a portion of the belt to the U-shaped member so that substantially no relative movement is allowed between the U-shaped member, the belt and the first attaching means; and a second attaching means, further from the curved surface forming the bottom of the U than said first means, for allowing relative movement between the belt and the U-shaped member while concurrently permitting the transfer of load at the second attaching means.

4. A fastener for splicing conveyor belting and the like comprising:

a U-shaped member adapted to be attached by an attaching means to one of the belt ends to be spliced, said U-shaped member comprising an upper plate and a lower plate and a slotted curved portion connecting said upper and lower plates, said slotted curved portion being adapted to interengage with the curved portion of at least one other U-shaped member, said upper plate and said lower plate being adapted to engage the respective opposite faces of one of the ends of the belt to be spliced, said upper plate and lower plate each having a plurality of orifices for receiving an attaching means therein, said orifices in each plate consisting of a first row of orifices and a second row of orifices, said second row being farther from said curved portion than said first row and the orifice in said second row being in the form of slots at an angle to the longitudinal axis of a belt properly positioned in the space between said plates, the orifices in said first and second row in each plate being aligned with the corresponding orifices in the other plate.

5. A fastener according to claim 4 wherein some of the angled slots forming the second row are slanted in opposite directions so that rotational forces are balanced out.

6. A fastener according to claim 4 wherein said first row of orifices are slightly staggered from each other in a longitudinal direction along the belt.

7. A fastener according to claim 4 wherein the angled slots of the second row of orifices are formed in one direction and a third row of slotted orifices farther from said curved portion than said second row are slanted in the opposite direction from said first row.

8. A splice for conveyor belts and the like comprising:
a belt with two ends to be spliced,
at least two U-shaped members adapted to be attached around the belt ends that are to be spliced,
each of said U-shaped members comprising an upper plate and a lower plate,
said upper plate and said lower plate engaging the respective opposite faces of the belt ends,
said upper and lower plate being connected by a curved portion forming the bottom of the U,
said curved portion having slots cut therein to form interengaging fingers with said other U-shaped member,
a hinge pin passing through said interengaging fingers for holding the respective U-shaped members together,
there being a first row of orifices close to the hinge pin in each of the U-shaped member's upper and lower plate, a rivet in each of said orifices and adapted to extend through said belt for the connecting of said upper and lower plates with said belt,
the cross section of each of said first orifices and its respective rivet being of such a configuration that under load there is substantially no relative movement allowed between said rivets and the U-shaped member,
there being a second row of orifices in each of the U-shaped member's upper and lower plates in the form of elongated slots further from the locking pin than said first row, said slots being at an angle to the longitudinal axis of the belt, a rivet being received in each of said slots and extending through said belt, the slots being of such sizes and so positioned that under load, relative movement is permitted between said rivets and said U-shaped member concurrently with the transfer of load therebetween at the second row of orifices.

9. A splice according to claim 8 wherein said first row of orifices and rivets are slightly staggered from each other in a longitudinal direction along the belt.

10. A splice according to claim 8 wherein some of the angled slots forming the second row of orifices are slanted in opposite directions so that rotational forces are balanced out.

11. A splice according to claim 8 wherein the angled slots of the second row of orifices are formed in one direction and a third row of slotted orifices are formed farther from the locking pin than said second row and slanted in the opposite direction from said first row.

12. A splice according to claim 8 wherein the slots in said upper and lower plates forming said interengaging fingers are curved in the portions of the slots farthest from the locking pins in order to reduce strain concentrations.

13. A splice for conveyor belts and the like comprising:
a belt with two ends to be spliced,
two rigid members adapted to be attached to the belt ends that are to be spliced,
one rigid member forming an upper plate and the other forming a lower plate,
said upper plate and said lower plate engaging the respective opposite faces of the belt ends,
said upper plate and said lower plate each have a first two rows of orifices close to where the belt ends are positioned when spliced, a rivet in each of said orifices adapted to extend through said belt for the connecting of said upper and lower plates with said belt,
the cross section of each of said first two rows of orifices and its respective rivet being of such a configuration that under load there is substantially no relative movement allowed between the rivets and the two rigid members,
there being two additional rows of orifices in said upper and lower plates in the form of elongated slots further from where the belt ends meet than said first rows, on either side of said first two rows, and at an angle to the longitudinal axis of the belt, wherein the slots are of such sizes and so positioned that relative movement is permitted between said rivets, said belt and said rigid members concurrently with the transfer of load therebetween.

* * * * *